United States Patent [19]

Murphy

[11] Patent Number: 5,251,354
[45] Date of Patent: Oct. 12, 1993

[54] TRANSFER DEVICE

[76] Inventor: James F. Murphy, Dunganny, Trim, County Meath, Ireland

[21] Appl. No.: 908,551

[22] Filed: Jun. 30, 1992

Related U.S. Application Data

[63] Continuation of Ser. No. 770,154, Oct. 3, 1991, abandoned, which is a continuation of Ser. No. 582,644, Sep. 13, 1990, abandoned.

[30] Foreign Application Priority Data

Sep. 13, 1989 [IE] Ireland .................... 2928/89

[51] Int. Cl.$^5$ .................... E01D 1/00; E01D 15/00
[52] U.S. Cl. .................... 14/71.5; 70/269
[58] Field of Search .................... 14/71.3, 71.5; 70/269

[56] References Cited

U.S. PATENT DOCUMENTS

| | | | |
|---|---|---|---|
| 3,422,477 | 1/1969 | Riggles, Jr. | 14/71.5 |
| 3,462,787 | 8/1969 | Seipos | 14/71.5 |
| 3,538,528 | 11/1970 | Porter et al. | 14/71.5 |
| 3,581,331 | 6/1971 | Fisher et al. | 14/71.5 |
| 3,815,713 | 6/1974 | Dietrich | 192/13 A |
| 3,839,760 | 10/1974 | Nagy | 14/71.5 |
| 4,319,376 | 3/1982 | Saunders | 14/71.5 |
| 4,328,689 | 5/1982 | Keller et al. | 70/269 X |
| 4,333,195 | 6/1982 | Lichti | 14/71.5 |
| 4,543,677 | 10/1985 | Haglund | 14/71.5 |
| 4,553,720 | 11/1985 | Harder | 14/71.5 X |
| 4,572,550 | 2/1986 | Harder | 14/71.5 X |
| 4,929,007 | 5/1990 | Bartczak et al. | 292/216 X |

FOREIGN PATENT DOCUMENTS

| | | |
|---|---|---|
| 0084916 | 3/1983 | European Pat. Off. . |
| PCT/DE84/-00197 | 4/1985 | Fed. Rep. of Germany . |
| 7517822 | 8/1975 | France . |
| 8010995 | 4/1985 | France . |
| 8303430 | 10/1983 | Netherlands . |
| 2194585A | 9/1986 | United Kingdom . |

Primary Examiner—Kenneth J. Dorner
Assistant Examiner—Nancy P. Connolly
Attorney, Agent, or Firm—Jacobson, Price, Holman & Stern

[57] ABSTRACT

A security transfer device (1) for mounting on a side wall of a building such as a bank, for example, for transferring valuables between a vehicle and the building includes a duct (2) slidably mounted in a housing (3) secured in a wall (23) of the building and movable between a retracted stored position within the housing (3) and an extended in-use position projecting outwardly of the housing (3). A releasable ratchet mechanism (4) extends between the duct (2) and housing (3). When engaged the ratchet mechanism only permits outward movement of the duct (2), thus preventing the duct (2) from being pushed back into the housing from outside the building. A lockable door (12) closes an inner end of the housing (3). The duct (2) is also closed at it's rear end (19) by a lockable security door (20).

20 Claims, 9 Drawing Sheets

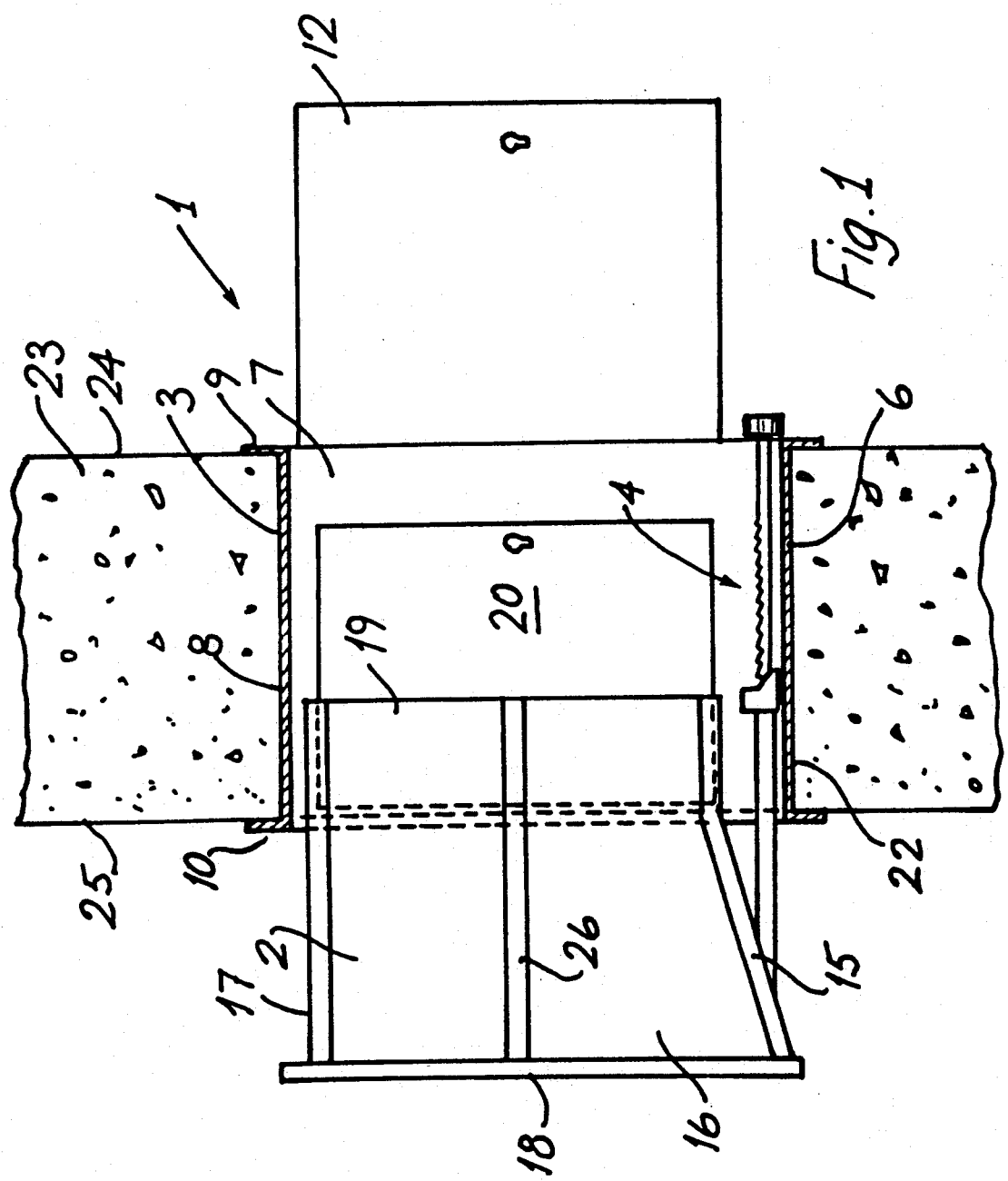

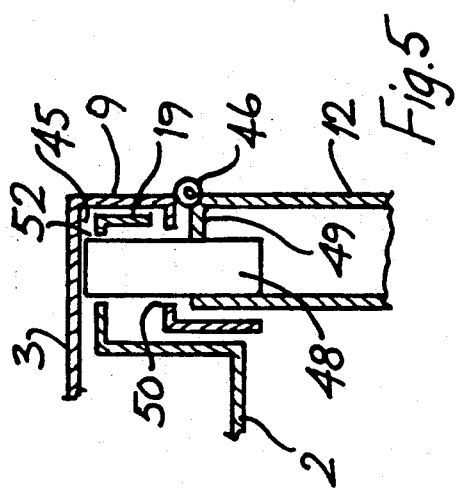
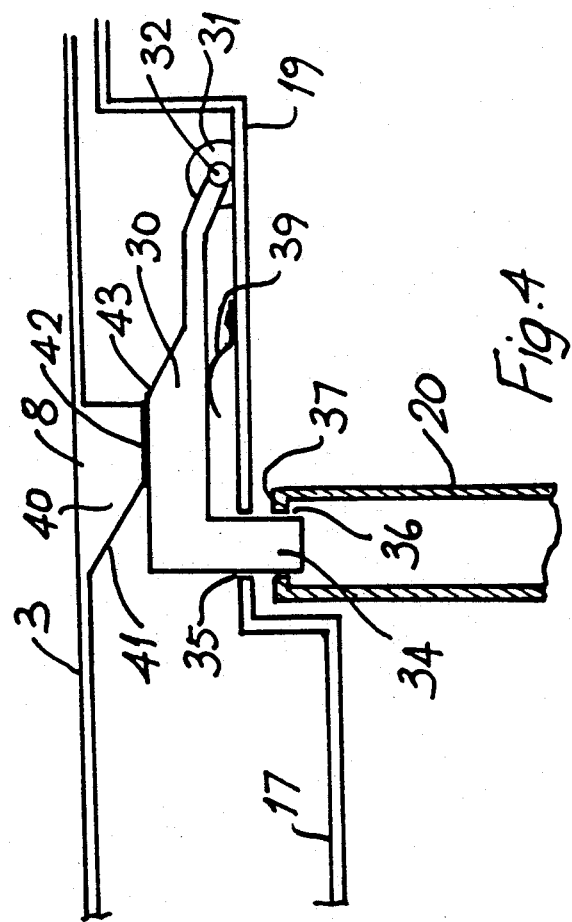
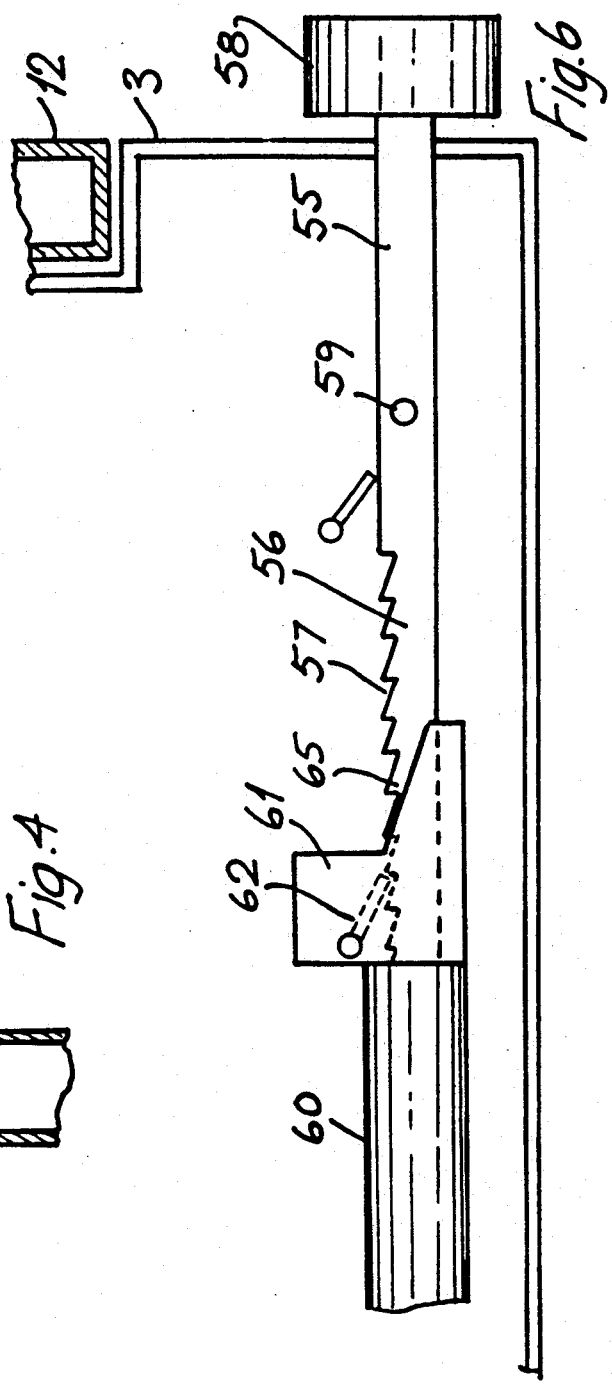

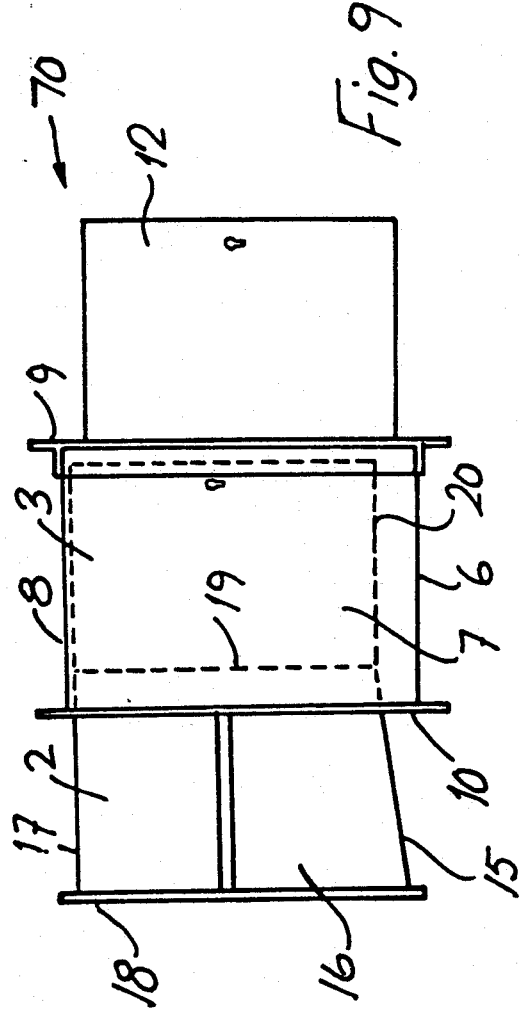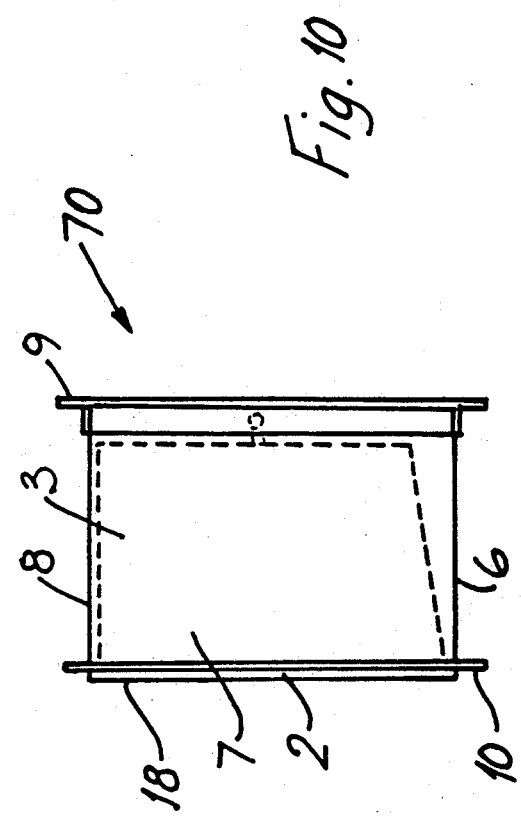

TRANSFER DEVICE

This is a continuation of application Ser. No. 07/770,154, filed Oct. 3, 1991 which was abandoned upon the filing hereof; which in turn is a continuation of application Ser. No. 07/582,644, filed Sep. 13, 1990, now abandoned.

BACKGROUND OF THE INVENTION

This invention relates to a security transfer device for transferring valuables between a vehicle and a building such as a bank, or another vehicle.

Armored security vans are commonly used to transport cash between banks and to collect or deliver cash at supermarkets, factories and the like. While the security vans themselves may be relatively secure at each destination cash is usually carried by security guards between the van and the bank or other building. During this cash transfer operation the guards are particularly vulnerable to robbery and attack by thieves whom nowadays are generally well armed.

BRIEF SUMMARY OF THE INVENTION

The present invention is directed towards overcoming this problem.

According to the invention there is provided a security transfer device for a building and a vehicle each having a transfer opening in a face thereof, comprising a duct on a support frame for mounting behind one face, the duct being movable through the opening to abut against the other face to surround the other opening, and a releasable stop for retaining the duct against the face.

In one embodiment of the invention the stop comprises a ratchet mechanism.

In a preferred embodiment a lockable security closure member is provided within the duct.

Preferably a locking device is provided for the security closure member comprising a bolt mounted in the duct and engagable with a receiver in the closure member, the bolt spring being biased out of engagement, the bolt incorporating a cam follower engagable with a cam on the support frame, the cam having a profile defining a locking position with the duct in the retracted position.

In a further embodiment an additional duct inner end closure member is provided by a back plate on the support frame, and a locking mechanism is provided to lock the duct to the closure member.

In another embodiment the ratchet mechanism comprises a rod rotatably mounted on the support frame, the rod having a serrated shank slidable within a complimentary ratchet cylinder mounted on the duct, the ratchet cylinder having a pawl for engagement with the serrations on the rod, the rod being rotatable within the ratchet cylinder for disengagement of the pawl, a cam follower on one of the rod and the ratchet cylinder for engagement with a cam on the other of the rod and the ratchet cylinder, the cam having a profile defining an engaged position with the duct retracted.

In a further embodiment an electric motor drive is provided for movement of the duct on the support frame.

In another embodiment the duct is slidably mounted on the support frame by track means comprising a number of rollers mounted on one of the duct and the support frame, the rollers rotatably engaging associated tracks on the other of the duct and the support frame.

BRIEF DESCRIPTION OF THE DRAWINGS

The invention will be more clearly understood from the following description of some embodiments thereof, given by way of example only, with reference to the accompanying drawings, FIG. 1 is a side elevational, partially cross-sectional view of a security transfer device according to the invention, shown mounted in a wall;

FIG. 4 is a detail partially cross-sectional side view of portion of the transfer device;

FIG. 5 is a detail partially cross-sectional plan view of another portion of the transfer device;

FIG. 6 is a detail partially cross-sectional side view of a ratchet mechanism forming portion of the transfer device;

FIG. 9 is a side elevational view of another embodiment of the security transfer device according to the invention;

FIG. 10 is a similar to FIG. 9 with a duct portion of the device shown in a retracted stored position;

DETAILED DESCRIPTION

Figure 3:
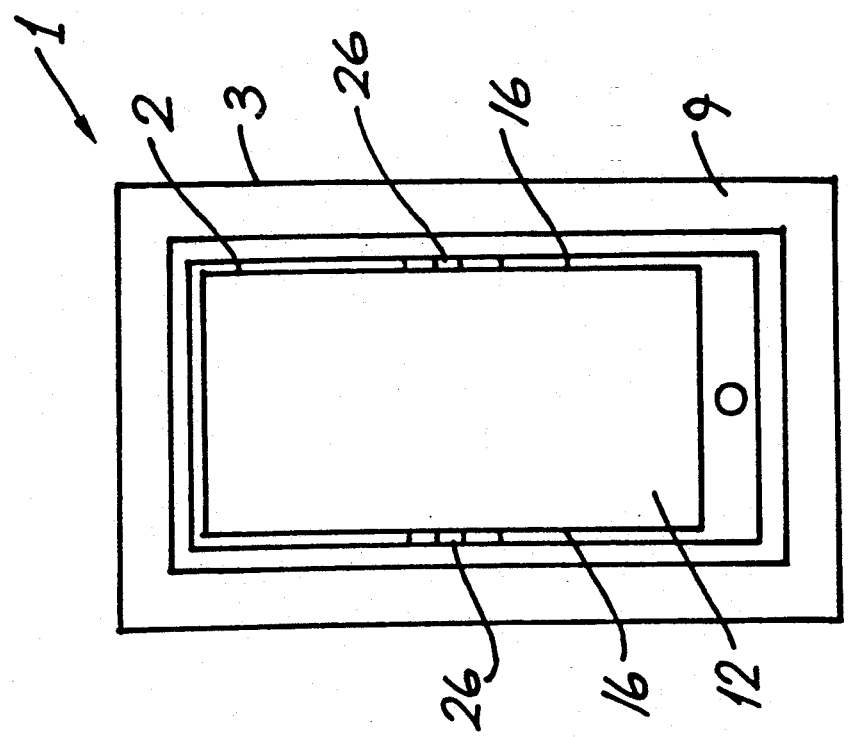
FIG. 3 is a rear elevational view of the transfer device.
Figure 2:
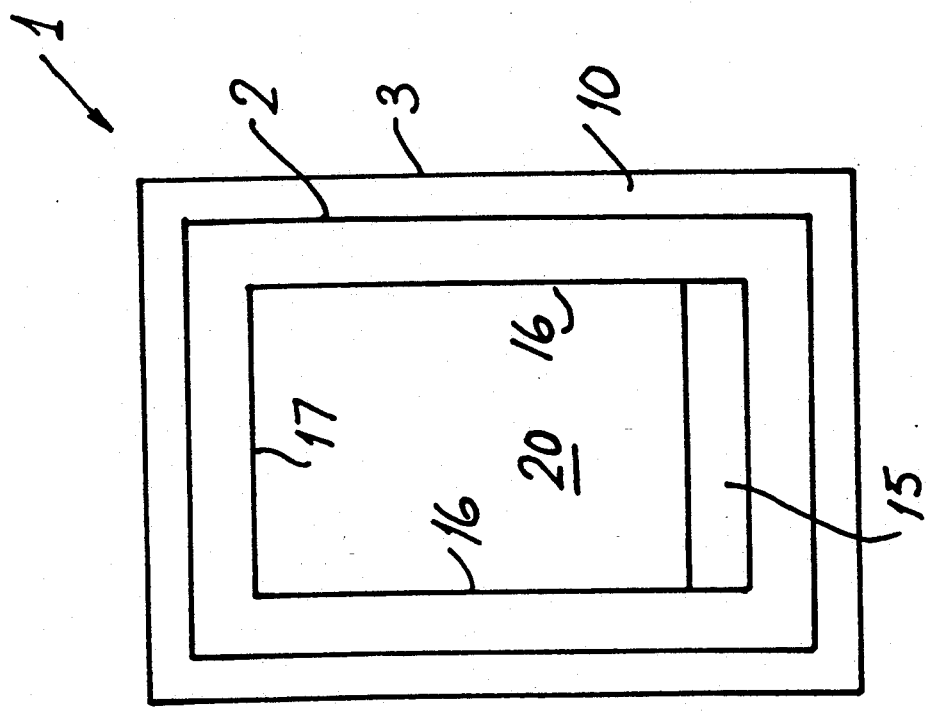
FIG. 2 is a front elevational view of the transfer device.
Figure 8:
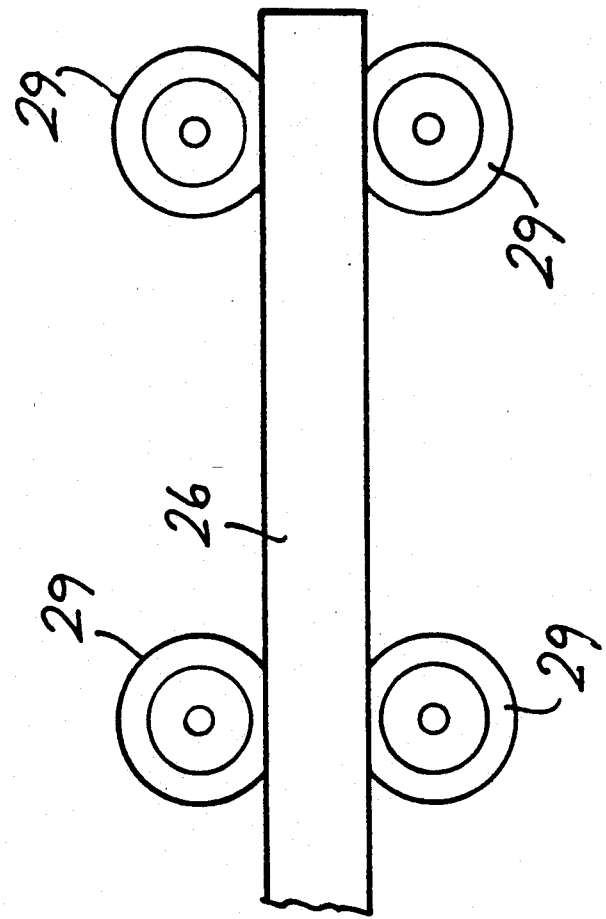
FIG. 8 is a detail side view of the track from the right of FIG. 7.
Figure 7:
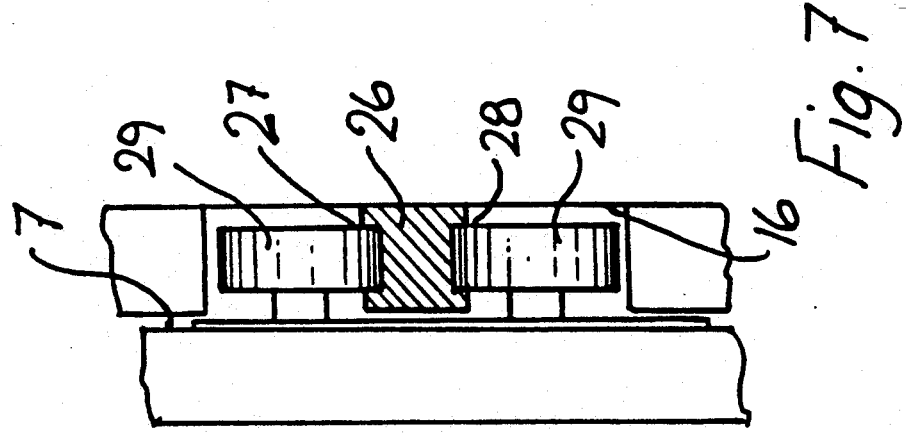
FIG. 7 is a partially cross-sectional front detail view showing a track for slidably supporting a duct in the housing of the transfer device.
Figure 12:
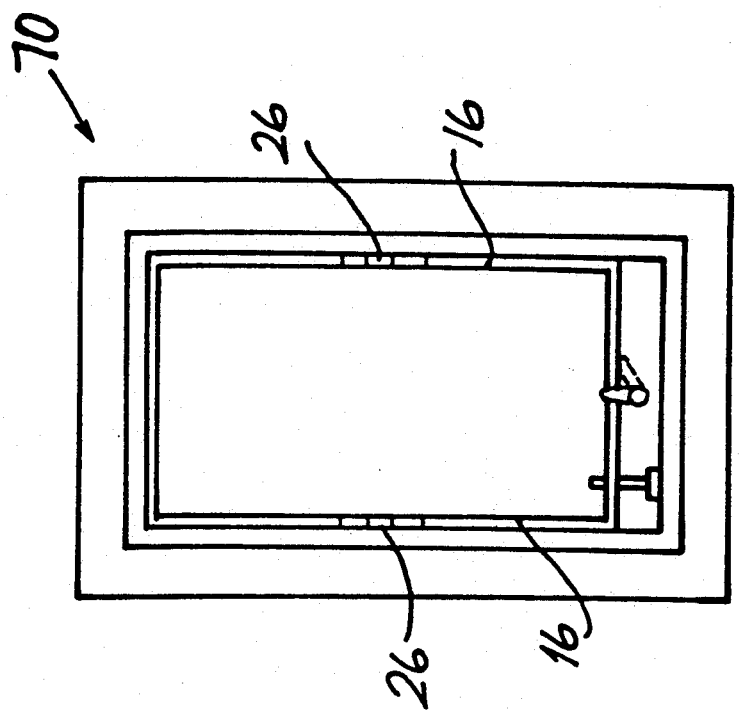
FIG. 12 is a rear view of the transfer device of FIG. 9.
Figure 11:
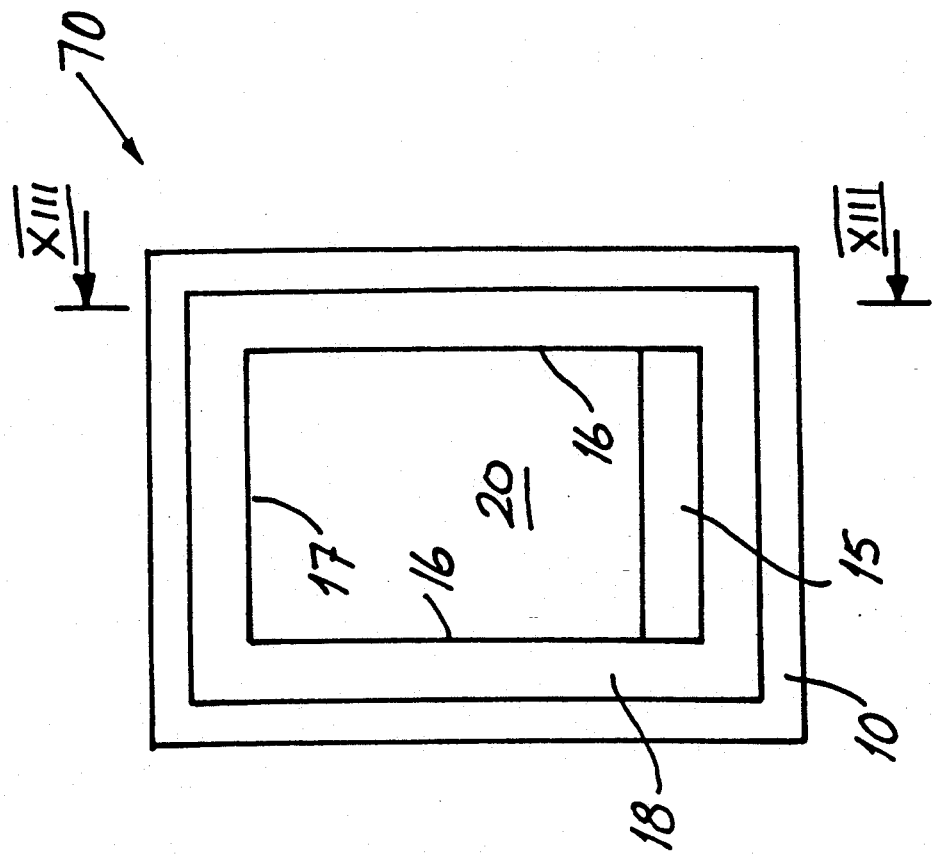
FIG. 11 is a front view of the transfer device of FIG. 9.
Figure 13:
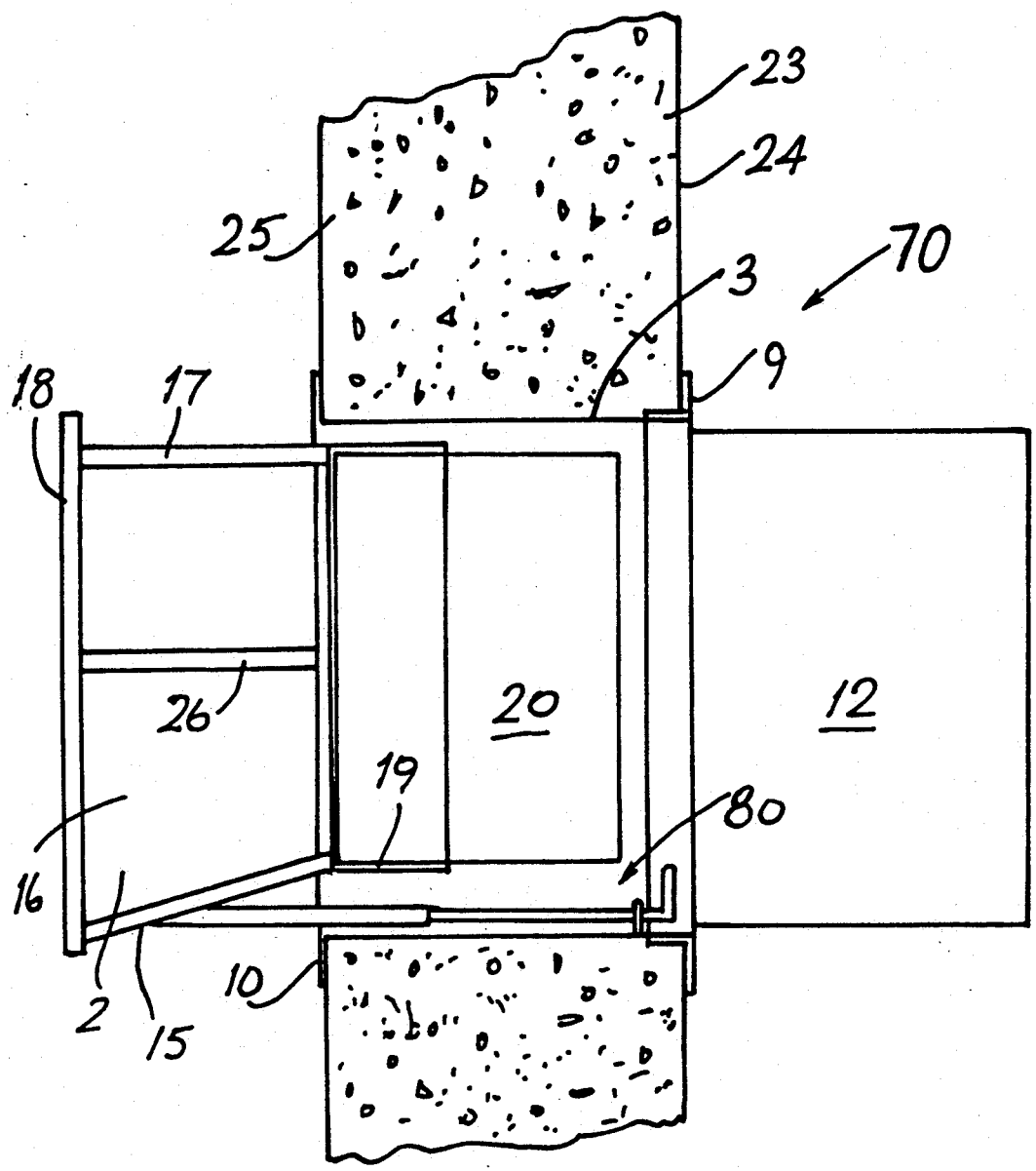
FIG. 13 is a partially partially cross-sectional view of the transfer device of FIG. 9 taken along the line XIII—XIII of FIG. 11, the transfer device being shown in use mounted in a wall of a building.
Figure 14:
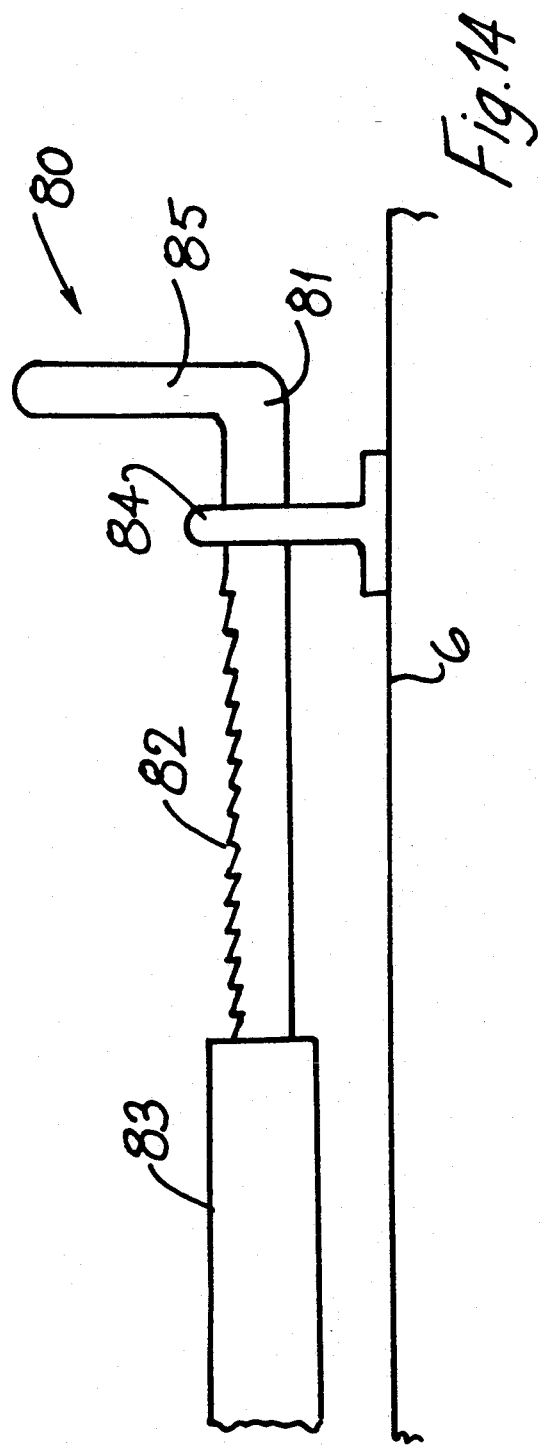
FIG. 14 is a detail side elevational view of a ratchet portion of the device.

Referring to the drawings and initially to FIGS. 1 to 8 thereof, there is illustrated a security transfer device according to the invention indicated generally by the reference numeral 1. The security transfer device 1 comprises a duct 2 slidably mounted within a support frame which in this case comprises a housing 3. The duct 2 is movable between a retracted stored position, within the housing 3, and an extended in-use position as shown in FIG. 1. A ratchet mechanism indicated generally by the reference numeral 4 extends between the duct 2 and the housing 3.

The housing 3 is of rectangular cross section having a bottom 6, upstanding side walls 7, a top 8, a flanged inner end 9 and a flanged outer end 10. A lockable door 12 closes the inner end 9.

The duct 2 is also of rectangular section having a base 15, side walls 16, a top 17, an open flanged front end 18 and a roar end 19 closed by a lockable security door 20 typically of bullet-proof steel. It will be noted that the base 15 slopes upwardly between the front end 18 and the rear end 19. FIG. 1 shows the security transfer device 1 mounted in an opening 22 in a wall 23 of a building such as a bank, the wall 23 having an inside face 24 and an outside face 25, the duct 2 being mounted on the housing 3 behind the outside face 25 and movable through the opening 22. A handle is provided on an inside face of the security door 20.

A track device means for slidably mounting the duct 2 in the housing 3 comprises a pair of horizontal tracks 26 fitted centrally on outside faces of the side walls 16 of the duct 2. Each track 26 has an upper slot 27 and a lower slot 28 extending along its length to receive rollers 29 mounted on the interior faces of the side walls 7 of the housing 3. As will be seen from FIGS. 7 and 8 the rollers 29 are arranged in a number of spaced-apart pairs, each pair of rollers 29 receiving a track 26 therebetween.

Referring now in particular to FIG. 4. A conventional deadlock is provided on the security door 20. In addition to this, an L-shaped locking bolt 30 is pivotally mounted on a top 17 of the duct 2 at the rear end 19 of the duct 2 by a bracket 31 and pivot pin 32. An outer end 34 extends through a hole 35 in the top 17 for engagement with a complementary receiver slot 36 provided in an upper edge 37 of the security door 20. A leaf spring 39 mounted on the top 17 of the duct 2 engages an underside of the locking bolt 30 urging the locking bolt 30 upwardly towards a retracted disengaged position. A cam block 40 projects inwardly of the top 8 of the housing 3 and has a sloped front face 41 and a bottom face 42 which together form a cam surface for engagement with a back 43 of the bolt 30 which forms a cam follower to urge the locking bolt 30 against spring bias into engagement in a locking position with the receiver slot 36 when the duct 2 is in the stored position as illustrated in FIG. 4.

Referring now to FIG. 5, at the inner end of the housing 3 a channel 45 is formed at the side walls of the housing 3 for reception of the inner end 19 of the duct 2. The door 12 is mounted by a hinge 46 at one side of the housing 3. A number of hinge bolts 48 extend outwardly of a hinge side 49 of the door 12 for locking engagement through openings 50 in an inner side wall of the channel 45 with slots 52 in the inner end 9 of the duct 2 when the duct 2 is in the stored position illustrated in FIG. 5.

Referring now to FIG. 6 in which the ratchet mechanism 4 is illustrated, the ratchet mechanism 4 comprises a rod 55 rotatably mounted on the housing 3 and having a serrated shank 56 with ratchet teeth 57 and an operating knob 58 at an end of the rod 55 extending rearwardly of the housing 3. A spigot 59 forming a cam follower extends laterally of the rod 55 between the shank 56 and the knob 58. A complementary ratchet cylinder 60 is mounted on the base 15 of the duct 2. The ratchet cylinder 60 has an inner end 61 housing a pivotable pawl 62 for engagement with the ratchet teeth 57. It will be noted that the pawl 62 slides over the teeth 57 as the duct 2 is moved from a stored position to an extended position; however, the pawl 62 engages the teeth 57 to prevent movement of the duct 2 back into the housing 3 from an extended position towards the stored position. The rod 55 is rotatable within the ratchet cylinder 60 to disengage the pawl 62 from the ratchet teeth 57 to allow retraction of the duct 2. Upon retraction a cam surface 65 on the inner end 61 of the ratchet cylinder 60 engages the spigot 59 to rotate the rod 55 into a normal operating position in which the ratchet teeth 57 are aligned with the pawl 62 as the duct 2 approaches the stored position, the pawl 62 engaging against the rod 55 forwardly of the ratchet teeth 57.

In use, the security transfer device 1 is mounted in an opening 22 in wall 23 of a bank or other building as shown in FIG. 1. When in the retracted stored position the duct 2 is locked within the housing 3 by the hinge bolts 48 of the door 12. Both the security door 20 on the duct 2 and the door 12 on the housing 3 are closed and locked, To transfer cash or other valuables using the security transfer device 1 a security van parks alongside the outside face 25 of the wall so that an inlet opening in a face of the security van through which money is delivered is directly opposite the duct 2. Then a person inside the bank opens the door 12 on the housing 3, thus releasing the duct 2 and pushes the duct 2 outwardly from the retracted stored position within the housing 3 to the extended in-use position in which the outer end 18 of the duct 2 abuts the face of the security van surrounding the inlet opening on the security van. The duct 2 is pushed outwardly until it engages against the side of the security van. It will be noted that the ratchet mechanism 4 automatically locks the duct 2 in the extended position preventing the duct 2 from being pushed back into the housing 3 from outside the building. As the duct 2 is moved forwardly the locking bolt 30 for the security door 20 (see FIG. 4) moves clear of the cam block 40 and the leaf spring 39 pivots the locking bolt 30 upwardly into a disengaged position. When the duct 2 is engaged against the security van the security door 20 at the rear end 19 of the duct 2 is opened and cash and/or other valuables can be transferred between the bank and the security van through the duct 2. Having completed the cash transfer the security door 20 is closed and locked. Then the rod 55 of the ratchet mechanism 4 is rotated by the knob 58 to release the ratchet mechanism 4. Now the duct 2 can be withdrawn into the housing 3 and returned to the stored position. As the duct 2 is withdrawn the spigot 59 on the rod 55 abuts and rides over the cam surface 65 to automatically realign the ratchet mechanism 4 into the normal operating position. Finally the door 12 on the housing 3 is shut and locked, the hinge bolts engaging the slots 52 at the inner end 19 of the duct 2 to lock the duct 2 within the housing 3.

It will be appreciated that the security transfer device 1 allows a direct transfer of cash between the bank and the security van and the security guard within the security van and bank personnel are well protected against any robbery attempt throughout operation of the security transfer device 1 and the cash transfer.

It will also be noted that in some cases the housing for the duct may be integrally formed with the wall of the building.

While in the embodiment described herein the security transfer device is shown mounted in a wall of a building, it is also envisaged that in some cases the security transfer device may be mounted on a security van or truck.

Referring now to FIGS. 9 to 15, there is illustrated another security transfer device according to the invention indicated generally by the reference numeral 70. The security transfer device 70 is largely similar to the security transfer device described previously with reference to FIGS. 1 to 8 and like parts are assigned the same reference numerals.

In this case the ratchet mechanism indicated generally by the reference numeral 80 is mounted within the housing 3 and extends between the duct 2 and the housing 3. The ratchet mechanism 80 comprises a rod 81 having a serrated shank 82 which is slidable and partially rotatable within a complimentary ratchet cylinder 83. The ratchet cylinder 83 is attached to the base 15 of the duct 2 and rod 81 is supported in a bracket 84 at an inner end of the bottom 6 of the housing 3. The rod 81 has an operating handle 85 at it's inner end.

Figure 15:
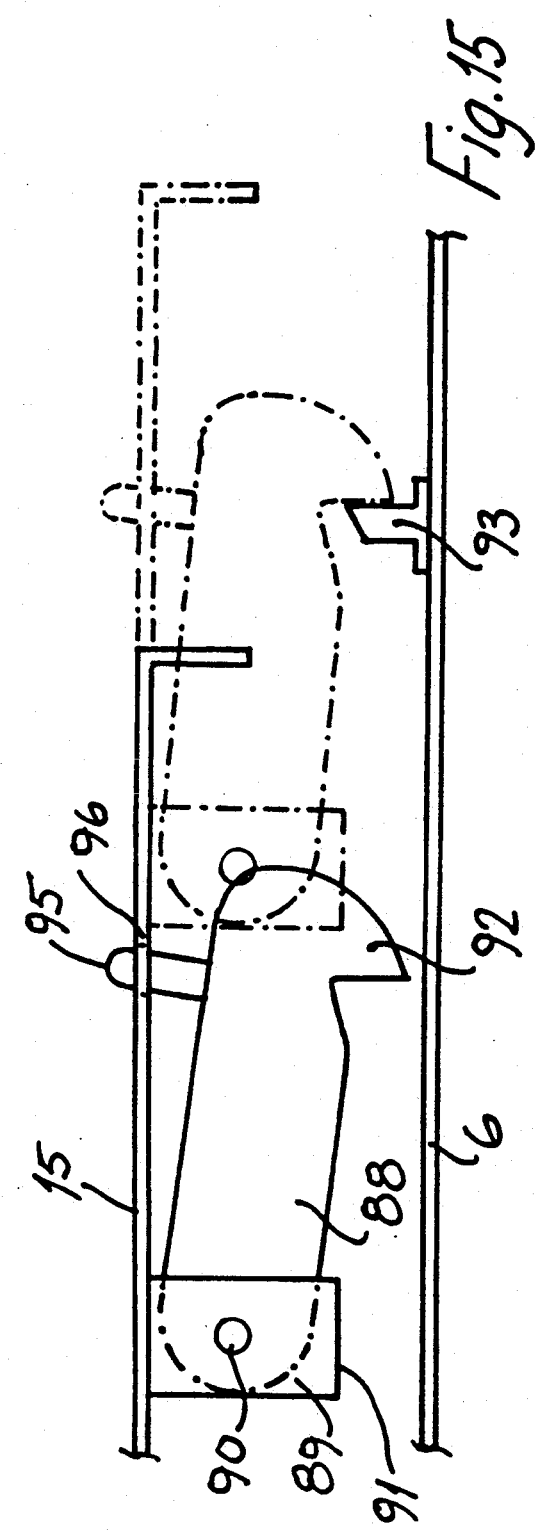
FIG. 15 is a detail side elevational view illustrating a locking device for the duct.

FIG. 15 shows a locking device for locking the duct 2 in the stored position. The locking device comprises a latch 88 having a front end 89 pivotally mounted by a pivot pin 90 on a bracket 91 depending from the base 15 of the duct 2. A hooked rear end 92 of the latch 88 is releasably engagable with a catch member 93 upstanding on the bottom 6 of the housing 3 adjacent the inner end of the housing 3. A pin 95 extends upwardly from the latch 88 passing through a hole 96 in the base 15 of the duct 2, the pin 95 being used to move the latch 88 to disengage it from the catch member 93. Engagement of the latch 88 with the catch member 93 is shown in broken outline in FIG. 15.

The security transfer device 70 is operated in similar fashion to the security transfer device described previously with reference to FIGS. 1 to 8. In this case, however, the duct 2 is locked in the stored position by the locking means shown in FIG. 15. As the duct 2 is withdrawn the hooked end 92 of the latch 88 abuts and rises over the catch member 93 to automatically engage the catch member 93.

Figure 16:
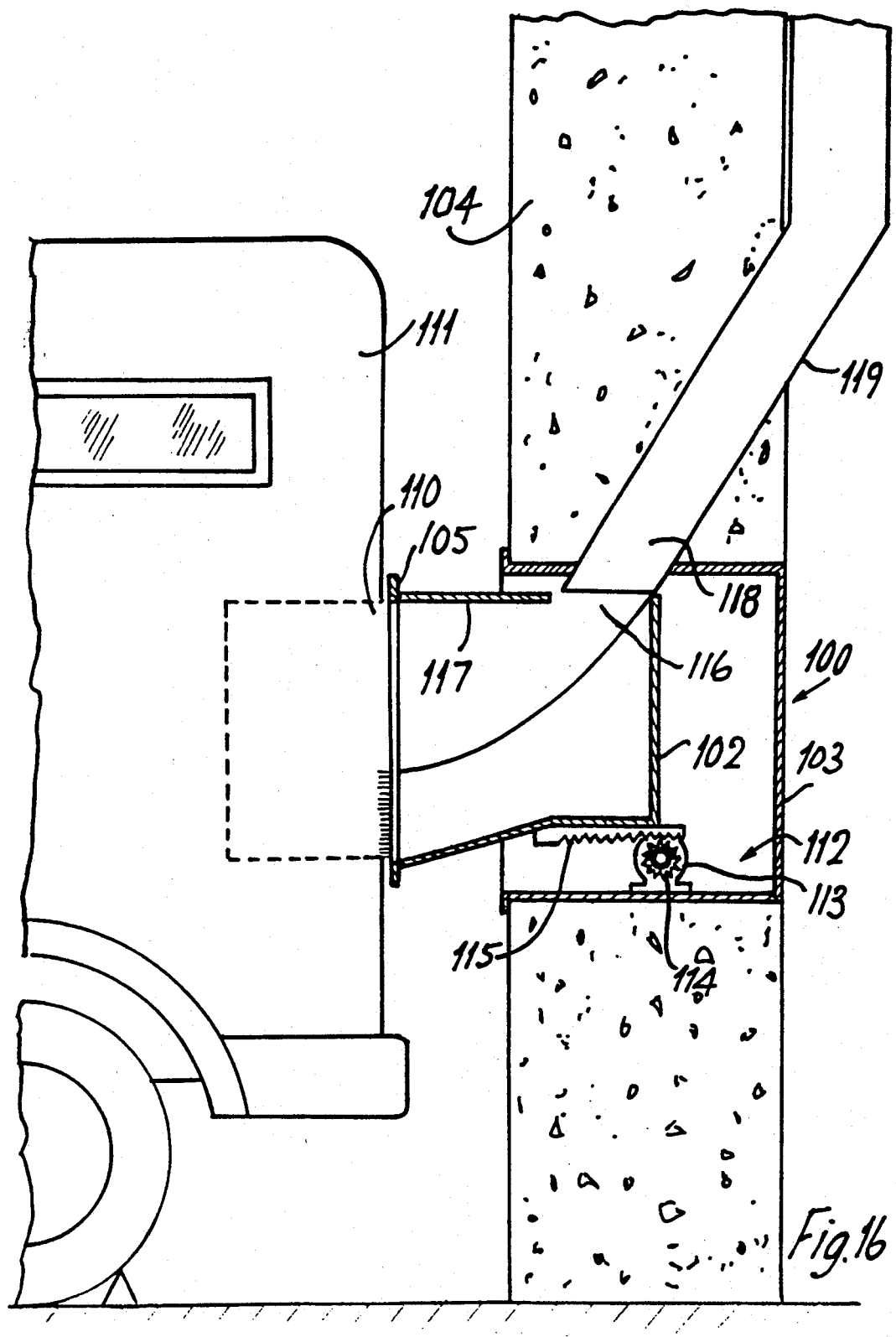
FIG. 16 is a side elevational and partially cross-sectional view of another security transfer device, shown in use.

Referring now to FIG. 16 there is illustrated another security transfer device according to the invention and indicated generally by the reference numeral 100. The security transfer device 100 comprises a duct 102 slidably mounted within a housing 103 fixed in a wall 104 of a bank for example. The duct 102 is movable between a retracted stored position within the housing 103 and an extended in-use position as shown in FIG. 16 in which an outer end 105 of the duct 102 abuts and surrounds a rim of an inlet opening 110 on a security van 111. An electric motor drive mechanism 112 is provided within the housing 103 to move the duct 102 between the stored position and an extended position and comprises a braked electric motor 113 driving a pinion 114 which engages a rack 115 on the duct 102. An opening 116 is provided in a top 117 of the duct 102. In an extended position the opening 116 locates beneath an outlet 118 of a chute 119 through which cash or other valuables are delivered from the bank to the van 111.

The invention is not limited to the embodiments hereinbefore described which may be varied in both construction and detail.

I claim:

1. A security transfer device for transferring valuables between a building and a vehicle each having a transfer opening in a face thereof comprising:
    a support frame for mounting in one of said transfer openings:
    a duct slidably mounted on the support frame and movable through said one of said openings between a retracted stored position and an extended in-use position for abutment against the face surrounding the other of said openings;
    a releasable stop means mounted between said duct and said support frame and being operable to prevent unauthorized retraction of said duct from an extended position toward said retracted position;
    a lockable security first closure member mounted within said duct for movement between an open position and a closed position; and
    automatically operated releasable locking means mounted on said duct for movement relative to said duct and said first closure member and engageable with said first closure member for automatically locking said first closure member in said closed position when said duct is in said retracted stored position and automatically releasing said first closure member when said duct is at a predetermined distance outwardly of said retracted stored position in the direction of said extended position.

2. The device as claimed in claim 1 and further comprising:
    side walls on said duct;
    a bolt receiving opening in one of said side walls of said duct adjacent said first closure member when said first closure member is in said closed position and said duct is in said retracted position; and wherein
    said releasable locking means comprises,
        a locking bolt movably mounted on said duct having a locking part movable through said bolt receiving opening,
        a locking opening in said first closure member for receiving said locking part of said bolt in a locking position when said duct is in said retracted position and said first closure member is in said closed position,
        resilient biasing means between said bolt and said duct for resiliently urging said bolt towards a retracted unlocked position disengaged from said locking opening in said first closure member,
        a cam follower on said bolt, and
        a cam on said support frame engagable with said cam follower when said duct is in said retracted position for urging said bolt into said locking position against the force of said biasing means and releasing said bolt when said duct is a predetermined distance from said retracted position towards said extended position.

3. A device as claimed in claim 1 and further comprising:
    an inner end on said duct; and
    a second closure member movably mounted on said support frame in spaced relationship to said first closure member and moveable between open and closed positions for opening and closing said inner end of said duct when said duct is in said retracted position.

4. A device as claimed in claim 3 and further comprising:
    second locking means on said second closure member in spaced relationship to said first locking member and releasably engageable with said duct for locking said duct in said retracted position when said second closure member is in said closed position thereof.

5. A device as claimed in claim 1 and further comprising:
    second releasable locking means mounted on said support frame in spaced relationship to said first locking means for locking said duct in said retracted position.

6. A device as claimed in claim 4 and wherein:

said second closure member comprises a door having one side and a hinge means on said one side for mounting said door to said support frame; and said second locking means comprises at least one locking bolt mounted on and projecting outwardly from said one side of said door, and at least one slot in said inner end of said duct for engageably receiving said at least one locking bolt when said duct is in said retracted position and said door is in said closed position.

7. A device as claimed in claim 1 wherein said releasable stop means comprises:

a ratchet mechanism operatively mounted between said support frame and said duct and being engageable for retaining said duct in adjustable positions in the direction of said extended position;

means for releasing said ratchet mechanism facilitating movement of said duct toward said retracted position; and means for re-setting said ratchet mechanism for said retaining when said duct is moved a predetermined distance toward said retracted position.

8. The device as claimed in claim 7 wherein:

said ratchet mechanism comprises a rod member mounted on said support frame and extending in the direction of movement of said duct, a serrated toothed portion on said rod member, a complimentary tubular member mounted on said duct for movement therewith and receiving said rod member for telescopic engagement therein, and a pawl pivotally mounted on said tubular member for engagement with said toothed portion of said rod member when said duct is in an extended position to prevent retraction of said duct;

said means for releasing said ratchet mechanism comprises said rod member being rotatably mounted on said support frame so that when rotated a predetermined amount said serrated toothed portion disengages from said pawl so that said duct is movable toward said retracted position; and said means for re-setting said ratchet mechanism comprises cam means on said tubular member and cam follower means on said rod member engagable with said cam means when said duct is moved toward said retracted position for rotating said rod member into a position of re-alignment of said toothed portion with said pawl so that said toothed portion and pawl are interengagable.

9. The device as claimed in claim 1 and further comprising:

electric motor means for moving said duct on said support frame between said retracted and extended positions.

10. The device as claimed in claim 1 and further comprising:

track means on one of said duct and support frame; and a plurality of rollers rotatably mounted on the other of said duct and support frame and engaging said track means for facilitating movement of said duct between said retracted and extended positions.

11. A device as claimed in claim 2 and further comprising:

an inner end on said duct; and a second closure member movably mounted on said support frame in spaced relationship to said first closure member and moveable between open and closed positions for opening and closing said inner end of said duct when said duct is in said retracted positions.

12. A device as claimed in claim 11 and further comprising:

second locking means on said second closure member in spaced relationship to said first locking means and releasably engageable with said duct for locking said duct in said retracted position when said second closure member is in said closed position thereof.

13. A device as claimed in claim 11 and further comprising:

second releasable locking means mounted on said support frame in spaced relationship to said first locking means for locking said duct in said retracted position.

14. A device as claimed in claim 12 wherein:

said second closure member comprises a door having one side and a hinge means on said one side for mounting said door to said support frame; and said second locking means comprises at least one locking bolt mounted on and projecting outwardly from said one side of said door, and at least one slot in said inner end of said duct for engageably receiving said at least one locking bolt when said duct is in said retracted position and said door is in said closed position.

15. A device as claimed in claim 2 wherein said releasable stop means comprises:

a ratchet mechanism operatively mounted between said support frame and said duct and being engageable for retaining said duct in adjustable positions in the direction of said extended position;

means for releasing said ratchet mechanism facilitating movement of said duct toward said retracted position; and means for re-setting said ratchet mechanism for said retaining when said duct is moved a predetermined distance toward said retracted position.

16. A device as claimed in claim 14 wherein said releasable stop means comprises:

a ratchet mechanism operatively mounted between said support frame and said duct and being engageable for retaining said duct in adjustable positions in the direction of said extended position;

means for releasing said ratchet mechanism facilitating movement of said duct toward said retracted position; and means for re-setting said ratchet mechanism for said retaining when said duct is moved a predetermined distance toward said retracted position.

17. The device as claimed in claim 15 wherein:

said ratchet mechanism comprises a rod member mounted on said support frame and extending in the direction of movement of said duct, a serrated toothed portion on said rod member, a complimentary tubular member mounted on said duct for movement therewith and receiving said rod member for telescopic engagement therein, and a pawl pivotally mounted on said tubular member for engagement with said toothed portion of said rod member when said duct is in an extended position to prevent retraction of said duct;

said means for releasing said ratchet mechanism comprises said rod member being rotatably mounted on said support frame so that when rotated a predetermined amount said serrated toothed portion disengages from said pawl so that said duct is movable toward said retracted position; and said means for re-setting said ratchet mechanism comprises cam means on said tubular member and cam follower means on said rod member engagable, with said cam means when said duct is moved toward said retracted position for rotating said rod member into a position of re-alignment of said toothed portion with said pawl so that said toothed portion and pawl are interengagable.

18. The device as claimed in claim 2 and further comprising:
    track means on one of said duct and support frame; and
    a plurality of rollers rotatably mounted on the other of said duct and support frame and engaging said track means for facilitating movement of said duct between said retracted and extended positions.

19. The device as claimed in claim 15 and further comprising:
    track means on one of said duct and support frame; and
    a plurality of rollers rotatably mounted on the other of said duct and support frame and engaging said track means for facilitating movement of said duct between said retracted and extended positions.

20. The device as claimed in claim 16 and further comprising:
    track means on one of said duct and support frame; and
    a plurality of rollers rotatably mounted on the other of said duct and support frame and engaging said track means for facilitating movement of said duct between said retracted and extended positions.

* * * * *